(12) United States Patent
Gottinger et al.

(10) Patent No.: US 9,936,635 B2
(45) Date of Patent: Apr. 10, 2018

(54) POWER TOOL

(71) Applicant: VIKING GmbH, Langkampfen (AT)

(72) Inventors: Clemens Gottinger, Kufstein (AT); Stefan Waldhör, Kufstein (AT); Stefan Schimmele, Kufstein (AT)

(73) Assignee: Viking GmbH, Langkampfen (AT)

( * ) Notice: Subject to any disclaimer, the term of this patent is extended or adjusted under 35 U.S.C. 154(b) by 71 days.

(21) Appl. No.: 14/859,319

(22) Filed: Sep. 20, 2015

(65) Prior Publication Data

US 2016/0081269 A1    Mar. 24, 2016

(30) Foreign Application Priority Data

Sep. 20, 2014  (EP) ..................................... 14003264

(51) Int. Cl.
*A01D 34/73* (2006.01)

(52) U.S. Cl.
CPC .................. *A01D 34/733* (2013.01)

(58) Field of Classification Search
CPC .. A01D 34/73; A01D 34/733; A01D 34/4165; A01D 34/63
USPC .............................. 56/255, 295; 30/276, 347
See application file for complete search history.

(56) References Cited

U.S. PATENT DOCUMENTS

| | | | | |
|---|---|---|---|---|
| 1,954,579 A | * | 4/1934 | Smith ..................... | A01D 34/73 56/17.1 |
| 2,859,581 A | * | 11/1958 | Kroll ..................... | A01D 34/73 56/295 |
| 3,097,467 A | | 7/1963 | Konrad | |
| 3,097,469 A | * | 7/1963 | Belfiore ................ | A01D 34/73 56/295 |
| 3,103,094 A | * | 9/1963 | Cook ..................... | A01D 34/73 56/295 |
| 3,399,519 A | * | 9/1968 | Buchanan .............. | A01D 34/73 56/295 |
| 4,083,166 A | * | 4/1978 | Haas ..................... | A01D 34/005 56/13.7 |
| 4,171,608 A | * | 10/1979 | Hetrick ................ | A01D 34/828 56/295 |
| 4,329,834 A | * | 5/1982 | Hetrick .................. | A01D 34/73 56/295 |
| 4,369,618 A | * | 1/1983 | Dell ....................... | A01D 34/73 56/295 |

(Continued)

FOREIGN PATENT DOCUMENTS

| | | |
|---|---|---|
| DE | 203 19 363 U1 | 2/2004 |
| EP | 0 324 322 A1 | 7/1989 |
| GB | 1 220 652 | 1/1971 |

*Primary Examiner* — Robert E Pezzuto
*Assistant Examiner* — Adam J Behrens
(74) *Attorney, Agent, or Firm* — Gudrun E. Huckett

(57) ABSTRACT

A power tool is provided with a drive motor and a drive shaft connected to the drive motor so as to be driven in rotation about an axis of rotation. A disk is fixedly secured to the drive shaft so as to rotate with the drive shaft. At least one knife is arranged on a face of the disk that in operation of the power tool is facing the ground. The at least one knife is fixedly connected to the disk and a driving torque for rotatingly driving the at least one knife about the axis of rotation is transmitted from the disk onto the at least one knife. A spacing of a radial outer edge of the at least one knife relative to the axis of rotation is smaller than a radius of the disk.

20 Claims, 3 Drawing Sheets

(56) References Cited

U.S. PATENT DOCUMENTS

| | | | | |
|---|---|---|---|---|
| 4,967,546 A | * | 11/1990 | Forbush | A01D 42/005 |
| | | | | 56/255 |
| 5,365,725 A | * | 11/1994 | McCance | A01D 42/005 |
| | | | | 56/16.9 |
| 5,408,815 A | * | 4/1995 | Forte | A01D 34/005 |
| | | | | 241/101.1 |
| 5,884,463 A | * | 3/1999 | Darzinskis | A01D 34/001 |
| | | | | 56/13.4 |
| 5,946,895 A | | 9/1999 | Martens | |
| 6,038,842 A | * | 3/2000 | Quiroga | A01D 34/73 |
| | | | | 56/17.5 |
| 9,480,201 B2 | * | 11/2016 | Maruyama | A01D 34/82 |
| 2008/0240884 A1 | * | 10/2008 | Dahners | B25B 13/485 |
| | | | | 411/190 |
| 2012/0063864 A1 | * | 3/2012 | Hess | F16B 39/24 |
| | | | | 411/326 |
| 2012/0137648 A1 | * | 6/2012 | Nikkel | A01D 45/10 |
| | | | | 56/295 |
| 2012/0318114 A1 | * | 12/2012 | Esain Eugui | A01D 34/733 |
| | | | | 83/651 |
| 2015/0271995 A1 | * | 10/2015 | Ikeno | A01D 34/68 |
| | | | | 56/255 |
| 2016/0021817 A1 | * | 1/2016 | Rojas | A01D 34/733 |
| | | | | 56/295 |
| 2016/0044866 A1 | * | 2/2016 | Nelson | A01D 34/733 |
| | | | | 56/255 |
| 2016/0157424 A1 | * | 6/2016 | Roth | A01D 34/733 |
| | | | | 56/255 |
| 2016/0278289 A1 | * | 9/2016 | Kasai | A01D 34/736 |
| 2017/0006776 A1 | * | 1/2017 | Svensson | A01D 34/733 |

* cited by examiner

POWER TOOL

BACKGROUND OF THE INVENTION

The invention relates to a power tool such as a lawnmower or the like, comprising at least one knife driven in rotation by a drive motor about an axis of rotation, wherein the power tool comprises a drive shaft on which a disk is arranged wherein on a face of the disk which is facing the ground in operation the at least one knife is arranged and wherein the spacing of the radial outer edge of the knife relative to the axis of rotation is smaller than the radius of the disk.

U.S. Pat. No. 5,884,463 discloses a lawnmower with a drive shaft that drives a knife and a disk that is arranged above the knife, i.e., on the side of the knife that is facing the mower housing. Since the diameter of the disk is smaller than the length of the knife, grass that is cut in the outer area can fly past the disk and can lodge within the mower housing.

U.S. Pat. No. 3,097,467 discloses a lawnmower with a cup-shaped component which projects downward past the knife and in this way prevents that dirt is thrown into the housing. The knife is directly screwed onto the drive shaft. The disk comprises at the disk center an opening in which a sleeve is arranged that surrounds the drive shaft so that the disk is supported on the drive shaft in a free-floating manner.

SUMMARY OF THE INVENTION

It is an object of the present invention to provide a power tool of the aforementioned kind that has a simple configuration.

In accordance with the present invention, this is achieved in that the disk is fixedly connected to the drive shaft so as to rotate with the drive shaft, that the knife is fixedly connected with the disk so as to rotate with the disk, and that the driving torque for rotatingly driving the knife is transmitted from the disk onto the knife.

It is thus provided that the knife is fixedly connected to the disk and the driving torque for rotatingly driving the knife is transmitted from the disk onto the knife. The disk itself is fixedly connected to the drive shaft so as to rotate with the drive shaft. In this way, a simple configuration of a power tool with disk and with knife is possible.

Advantageously, a receptacle for the knife is formed on the disk. Due to the receptacle, a reliable torque transmission from the disk onto the knife is provided. Advantageously, the disk comprises at least one web which is contacting the longitudinal side of the knife and delimits the receptacle. In this way, the knife can be positioned easily in the receptacle along the web. The contact of the knife on the web additionally provides for torque transmission from the disk onto the knife in a simple way.

Preferably, the receptacle comprises a bottom against which the knife is resting. In this way, the knife is positioned and secured in the receptacle with regard to the direction of height. Expediently, the bottom of the receptacle has a rib structure that forms the support for the knife. Due to the rib structure, stability is imparted to the bottom and thus to the receptacle and the entire disk. When the knife is mounted on the disk, correct positioning of the knife on the disk can be ensured even for slightly soiled disk or for slightly soiled knife because, when the knife comes into contact with the disk, the dirt is displaced into the space between the ribs of the rib structure and the knife is resting on the ribs in the predefined position. In operation, the knife substantially covers the rib structure so that the rib structure in operation is protected from becoming soiled.

Advantageously, the knife is connected to the disk with form fit. In this way, a great torque transmission from the disk onto the knife can be realized independent of the torque applied to a screw that secures the disk and the knife on the drive shaft. The torque transmission from the disk onto the knife is constructively predetermined in this way without requiring additional components. Advantageously, the disk has at least one pin that projects at a spacing to the axis of rotation into an opening of the knife. The pin enables in a constructively simple way a torque transmission from the disk onto the knife.

Preferably, the knife is secured by a fastening element in the direction of the axis of rotation on the drive shaft and the disk comprises at least one securing device for securing the fastening element. Expediently, the fastening element comprises a connecting element, in particular a nut, and the securing device prevents loosening of the connecting element. In particular, the securing device prevents rotation of the nut in the loosening or release direction. Accordingly, the knife can be driven in both rotational directions. In the first rotational direction, which is the direction of tightening the nut, loosening of the knife is constructively prevented by the screw connection. In the second rotational direction, the securing device prevents that, in operation, the nut can rotate in the loosening or release direction so that the knife is also prevented from becoming loose in the second rotational direction.

Expediently, on the disk at least one actuating element for releasing the securing device is arranged. Accordingly, by actuation of this actuating element, a user can release the securing device without use of a tool and the screw can be unscrewed, for example, by means of a wrench so that the knife can be removed from the disk.

Advantageously, the actuation element and the disk are of a one-piece construction. In this way, a constructively simple configuration is possible.

Expediently, the length of the knife is greater than the radius of the disk. The length of the knife is advantageously at least 70%, in particular at least 90%, of the diameter of the disk. It is particularly expedient that a continuous knife is fixedly connected to the disk so as to rotate with the disk.

It can be advantageous that the length of the knife is smaller than the radius of the disk. In particular, the knife is arranged in the outer area of the disk. Expediently, at least two knives are secured on the disk that act in particular in the same cutting plane.

DESCRIPTION OF THE PREFERRED EMBODIMENTS

Figure 1:
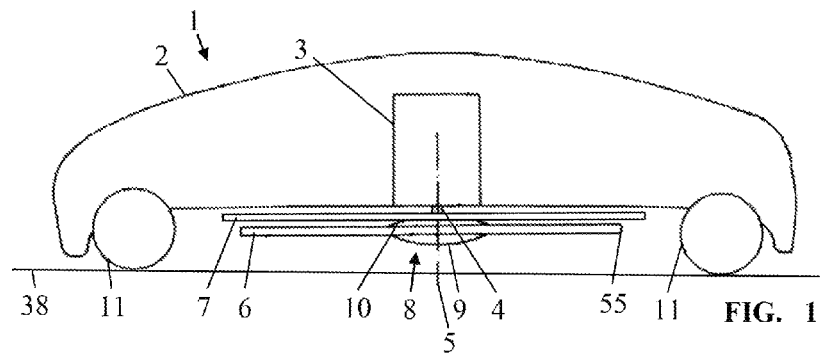
FIG. 1 is a schematic illustration of a power tool.
Figure 2:
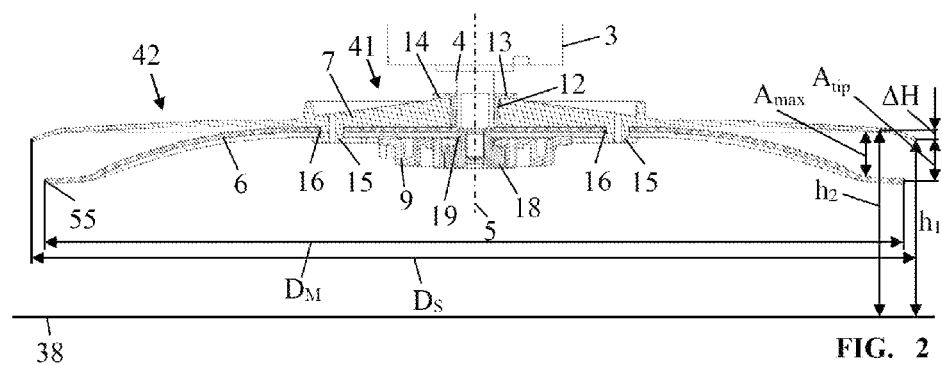
FIG. 2 is a schematic section view of the drive shaft, the knife, and the disk of the power tool of FIG. 1.
Figure 3:
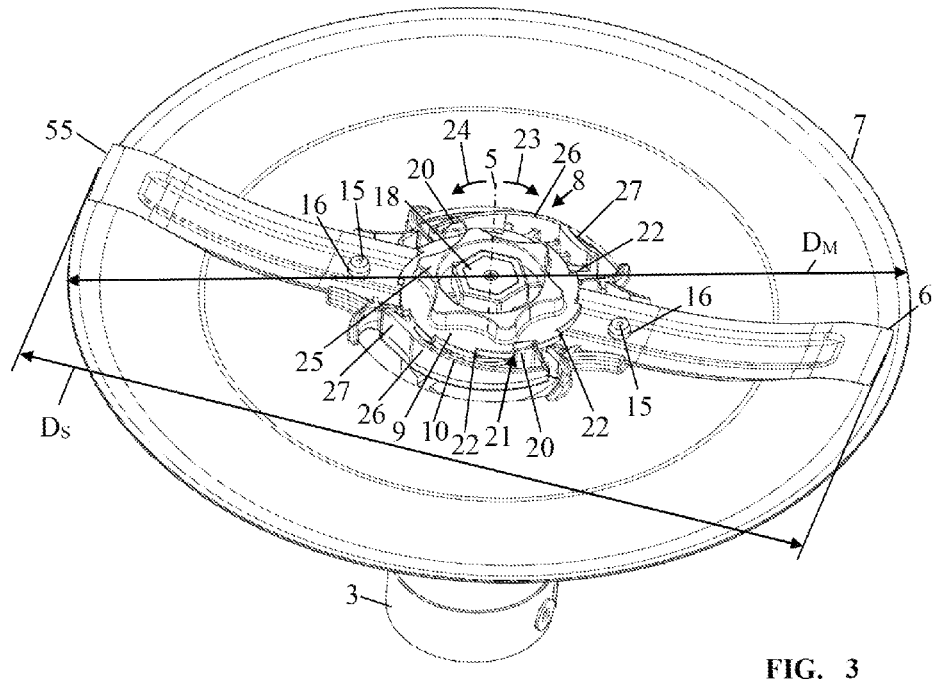
FIG. 3 is a perspective view of the arrangement of FIG. 2 from below.

FIG. 1 shows an embodiment of a power tool in the form of a lawnmower 1. The lawnmower 1 is designed as a self-propelled lawnmower which freely moves within a predefined area and is not guided or pushed by an operator. The lawnmower 1 however can also be guided by an operator. For this purpose, the lawnmower 1 comprises advantageously a handle (not illustrated). For driving across the ground 38, the lawnmower 1 comprises several wheels 11. The lawnmower 1 comprises a housing 2 in which a drive motor 3 is arranged. The drive motor 3 drives a drive shaft 4 in rotation about an axis of rotation 5. A disk 7 is attached to the drive shaft 4. A knife 6 is fastened to the disk 7 by means of a fastening device 8. The knife 6 ends radially with a radial outer edge 55, as shown in FIGS. 1 to 3. The radial outer edge 55 describes the cutting circle of the knife 6 when the knife 6 rotates. The fastening device 8 comprises a fastening element 9 which is arranged on the side of the knife 6 that is facing away from the drive motor 3 and interacts with the disk 7. The fastening device 8 secures the knife 6 in circumferential direction and in axial direction of the axis of rotation 5.

Due to the rotation of the disk 7 in operation, blades of grass which are thrown onto the disk 7 are transported by centrifugal force outwardly to the disk rim and fly away from the disk 7. In this way, it is ensured that the disk 7 is provided with a continuous self-cleaning action and, therefore, soiling of the disk 7 is minimal. The disk 7 delimits the quantity of dirt deposits on the housing 2. In this way, it is ensured that the knife 6 always has a spacing relative to the dirt deposits in operation. In operation of the lawnmower 1, the rotation of the knife and the dirt deposits cause no additional noise. No power loss of the lawnmower 1 due to dirt deposits occurs.

As shown in FIG. 2, a sleeve 12 is arranged on the disk 7 so as to penetrate the disk 7 and rest with a collar 13 on the topside 14 of the disk 7 which is facing the drive motor 3. On the opposite side, the collar 13 is resting on a shoulder (not illustrated) of the drive shaft 4 and is thereby secured in axial direction of the axis of rotation 5. The sleeve 12 provides a fixed connection between the drive shaft 4 and the disk 7 for common rotation. For this purpose, the sleeve 12 comprises flattened portions (not illustrated) which interact with corresponding flattened portions of the drive shaft 4 and flattened portions at an opening of the disk 7 which receives the sleeve 12.

For fixedly connecting the knife 6, the disk 7 comprises two pins 15 which project into corresponding openings 16 of the knife 6. The pins 15 and the openings 16 are shown in FIG. 3. In the embodiment, the two pins 15 are arranged diametrically opposed to each other relative to the axis of rotation 5. In the embodiment, the pins 15 have the same spacing relative to the axis of rotation 5.

The fastening element 9 is designed as a knurled nut, as shown in FIG. 3. The disk 7 and the fastening element 9 are comprised of plastic material. The fastening element 9 comprises a connecting element in the form of a hexagon nut 18 with which the fastening element 9 is screwed onto an appropriate outer thread of the drive shaft 4. In completely tightened state, the hexagon nut 18 is resting with a projection 19 on the knife 6 and forces the knife 6 against the sleeve 12 and against the drive shaft 4. The hexagon nut 18 and the sleeve 12 are comprised of metal. In a further embodiment, the fastening element 9 can be designed as a screw which is screwed into an appropriate inner thread of the drive shaft 4.

The knife 6 is resting on the disk 7 in the inner area 41 of the disk 7. The inner area 41 of the disk 7 is the area about the axis of rotation 5 which has relative to the axis of rotation 5 a distance of less than 35%, in particular less than 28%, in particular less than 20%, of the diameter $D_S$ of the disk 7. The inner area 41 of the disk 7 is adjoined by an outer area 42 of the disk 7. In the outer area 42 of the disk 7, the spacing between knife 6 and disk 7 with increasing radial distance from the axis of rotation 5 gradually increases to a maximum spacing $A_{max}$. The radial outer edge 55 of the knife 6 has relative to the disk 7 a spacing $A_{tip}$ that is approximately of the same size as the maximum spacing $A_{max}$. The maximum spacing $A_{max}$ is located in an area that, in the embodiment, is spaced away from the axis of rotation 5 by a distance of approximately 45% of the diameter $D_S$ of the disk 7. In a further embodiment, the maximum spacing $A_{max}$ can be expediently arranged in an area that is spaced away from the axis of rotation 5 by a distance of approximately 30% to approximately 47% of the diameter of the disk 7. The maximum spacing $A_{max}$ of the knife 6 amounts to a value of approximately 1% to approximately 20%, in particular approximately 2% to approximately 12%, in particular approximately 3% to approximately 8%, of the length $D_M$. The spacing of the knife 6 to the disk 7 is comparatively small. In order to prevent that the dirt that is adhering to the disk 7 and that is conveyed as a result of centrifugal force to the outer rim of the disk 7 is thrown into the housing 2, the outer rim of the disk 7 is slightly curved in the direction of the ground 38. The dirt that is transported by centrifugal force outwardly is therefore subjected due to the curved part to an impulse in the direction toward the ground 38. The curved part is arranged within the outer area 42 of the disk 7 and begins in an area that is spaced from the axis of rotation 5 by a distance that amounts to approximately 10% to approximately 50%, expediently approximately 20% to approximately 49%, advantageously approximately 45%, of the diameter of the disk 7 and ends at the outer circumference of the disk 7. In the area of the outer rim of the disk 7, an edge can also be provided which extends in the direction toward the ground 38. The spacing $h_1$ of the outer circumference of the disk 7 relative to the ground 38 is smaller than the spacing $h_2$ of the disk 7 at the beginning of the curved part; the difference between the spacing $h_2$ of the disk 7 at the beginning of the curved part relative to the ground 38 and the spacing $h_1$ of the outer circumference of the disk 7 relative to the ground 38 corresponds to a height change $\Delta H$ of the disk 7. The height change $\Delta H$ of the disk 7 in the direction of the axis of rotation 5 in the area of the curved part of the disk 7 amounts to a value of approximately 15%, in particular approximately 8%, in particular approximately 2%, of the diameter $D_S$ of the disk.

As shown in FIGS. 2 and 3, the disk diameter $D_S$ of the disk 7 is greater than the length $D_M$ of the knife 6. Accordingly, the disk 7 covers the knife 6 completely. Since the disk 7 is arranged on the side of the knife 6 which is facing the drive motor 3, the disk 7 protects the housing 2 from cut grass that is swirled and thrown by the knife 6 in the direction toward the drive motor 3. In this way, soiling of the inner side of the housing 2 is reduced.

Figure 4:
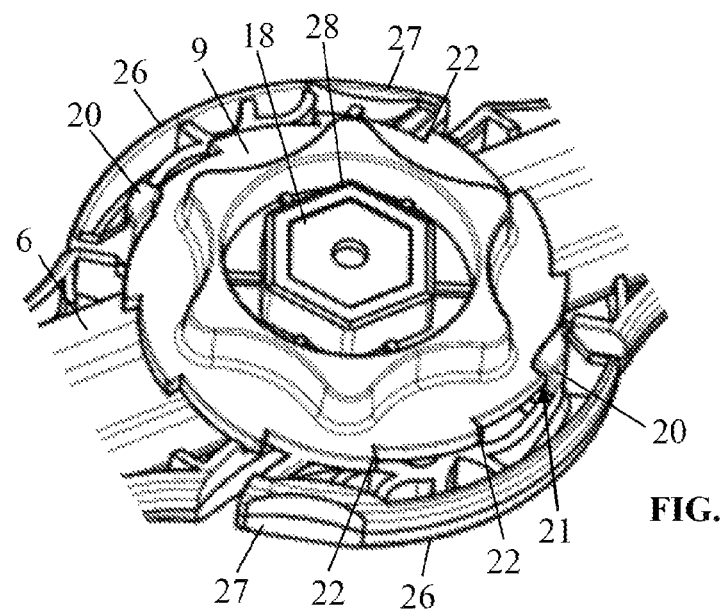
FIG. 4 is a perspective view of the fastening device from below.

FIGS. 3 and 4 show the fastening device 8 in detail. The fastening device 8 comprises two releasable securing devices 20 which are arranged diametrically opposite each other. The securing devices 20 are secured on the disk 7.

Each securing device 20 comprises a locking element 21 (FIG. 5) that locks in a locking position illustrated in FIG. 3 by interaction with a locking tooth 22 of the fastening element 9. The fastening element 9 is rotatable in a fastening direction 23 about the axis of rotation 5. Upon rotation of the fastening element 9 in fastening direction 23 about the axis of rotation 5, the threaded connection between the threaded sleeve 12 and the drive shaft 4 is tightened and the knife 6 is pressed against the disk 7. For releasing the fastening element 9, for example, for exchanging the knife 6, the fastening element 9 must be rotated in a loosening direction or release direction 24 that is oriented opposite to the fastening direction 23 about the axis of rotation 5. The movement in the release direction 24 is prevented by the locking elements 21 in the locking position. In this way, it can be prevented that the fastening element 9 will rotate accidentally in the release direction 24 in operation of the lawnmower 1.

For rotating the fastening element 9, the fastening element 9 comprises a gripping profile 25 where the operator can grip the fastening element 9. For releasing the securing device 20, two actuating elements, i.e., two levers 26 are provided which are positioned diametrically opposite each other. The levers 26 are pivotably supported on the disk 7 in the inner area 41. The levers 26 each have an actuating section 27 where the operator pushes on the lever 26 and therefore can deflect the locking elements 21, relative to the axis of rotation 5, in radial direction outwardly. Accordingly, the locking elements 21 are moved out of the area of the locking teeth 22 and the fastening element 9 can be rotated in the release direction 24. The actuating sections 27 of the levers 26 must be held in a pushed position until the fastening element 9 has been unscrewed to such an extent that the locking elements 21 no longer are positioned in the plane of the locking teeth 22 and no longer engage them.

As shown in FIG. 4, the fastening element 9 has a wall 28 which contacts the outer circumference of the hexagon nut 18, surrounds snugly the hexagon nut 18, and secures it fixedly on the fastening element 9. The wall 28 has an hexagonal outer circumference that can be engaged by a wrench so that the fastening element 9 can be quickly mounted or removed.

Figure 5:
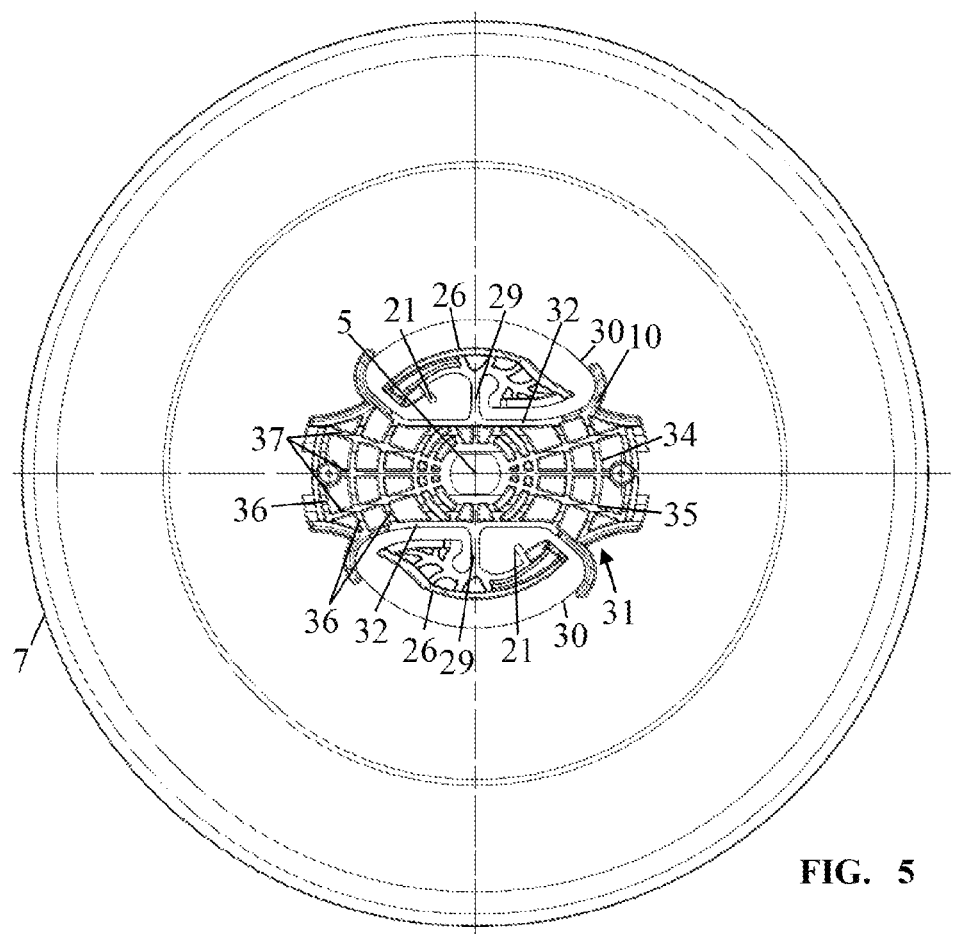
FIG. 5 is a plan view of the face of the disk which is facing the knife.
Figure 6:
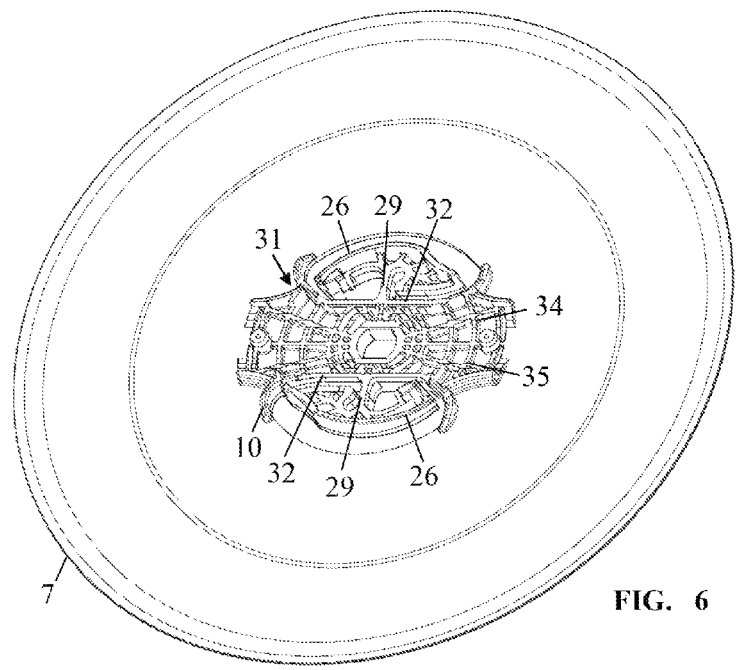
FIG. 6 is a perspective view of the face of the disk which is facing the knife.

As can be seen in FIGS. 5 and 6, the two levers 26 are connected by bending elements 29 with the disk 7. The bending elements 29 are elastic and designed in the embodiment as webs which are monolithically formed with the disk 7 and the levers 26. The levers 26 are connected exclusively by means of the bending elements 29 with the disk 7. Cutouts 30 in the disk 7 are provided in the area of the levers 26 so that the levers 26 can be pivoted. Each of the cutouts 30 is approximately kidney-shaped in a plan view (FIG. 5) and completely surrounds the levers 26 with the exception of the area of the bending element 29. The levers 26 are positioned in the plane of the disk 7. Since the levers 26 are positioned in the cutouts 30 and in the plane of the disk 7, the levers 26 are protected from accidental actuation, for example, when hit by a rock.

A receptacle 31 (see FIG. 5) for the knife 6 (FIG. 3) is formed on the disk 7. The disk 7 comprises two webs 32 that contact the two longitudinal sides of the knife 6 and delimit the receptacle 31 laterally. The receptacle 31 has a bottom 34 on which the knife 6 (FIG. 3) is resting. The bottom 34 has a rib structure 35 that forms a support for the knife 6 (FIG. 3). In the embodiment, the rib structure 35 is designed like a spider web. The rib structure 35 comprises transverse ribs 36 and longitudinal ribs 37 as illustrated in FIG. 5. The transverse ribs 36 extend like a part of a circle wherein the center point of the part of the circle is located on the axis of rotation 5. The transverse ribs 36 end at the webs 32. The longitudinal ribs 37 extend in a star shape wherein the center of the star is positioned on the axis of rotation 5. The longitudinal ribs 37 intercept the transverse ribs 36 approximately orthogonally. In order to increase the stability, in the inner area, i.e., the area that is proximal to the axis of rotation 5, several transverse ribs 36 are provided. In the embodiment, the rib structure 35 is comprised of a total of ten longitudinal ribs 37 and ten transverse ribs 36.

Figure 7:
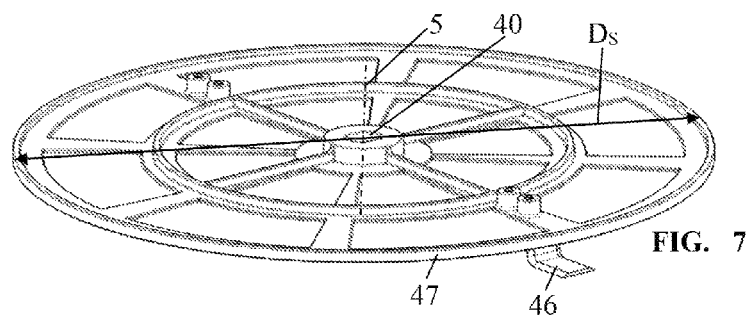
FIG. 7 is a perspective view of the face of the disk which is facing away from the knife in a further embodiment variant showing the knife arranged on the disk.
Figure 8:
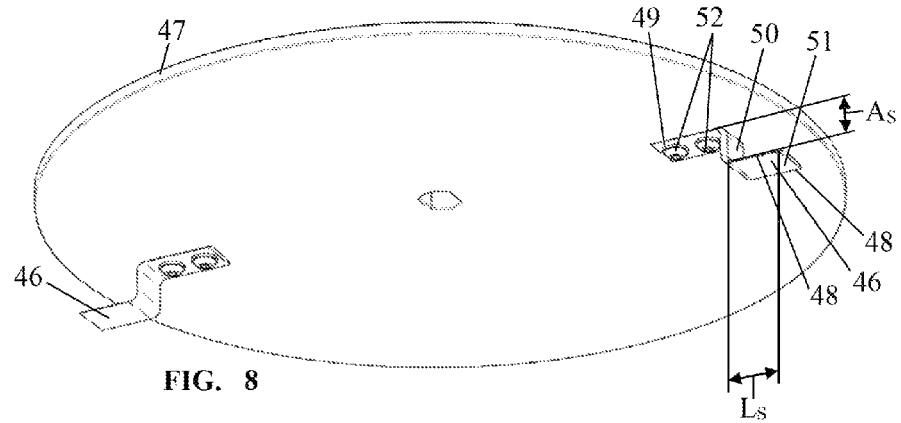
FIG. 8 is a perspective view of the side of the disk that is facing the knife, wherein the knife is arranged on the disk.

FIGS. 7 and 8 show a further embodiment of a disk 47. At the center of the disk 47 an opening 40 is provided for attaching the disk 47 to the drive shaft 4 (FIG. 2). Two knives 46 are secured on the disk 47. The two knives 46 are arranged symmetrically relative to the axis of rotation 5. Each of the knives 46 has a cranked or angled shape and is comprised of metal. Each of the knives 46 is positioned with a first section 49 on the disk 47 and is secured with two screws 52 on the disk 47. On a third section 51, two cutting faces 48 of the knife 46 are formed wherein each of the cutting faces 48 has a length $L_S$ in radial direction. The third section 51 extends approximately parallel to the first section 49 at a spacing $A_S$ so that in operation the cutting faces 48 can cut grass. The spacing $A_S$ amounts to a value of approximately 20% to approximately 80%, in particular approximately 30% to approximately 60%, advantageously approximately 35% to approximately 55%, of the length $L_S$. A second section 50 which is approximately orthogonal to the first section 49 and approximately orthogonal to the third section 51 connects the first section 49 and the third section 51 with each other. In the embodiment variant according to FIGS. 7 and 8, the knives 46 do not project past the disk 47 so that the cut grass and dirt will impact on the disk 47 and do not soil the housing 2.

The specification incorporates by reference the entire disclosure of European priority document 14 003 264.0 having a filing date of Sep. 20, 2014.

While specific embodiments of the invention have been shown and described in detail to illustrate the inventive principles, it will be understood that the invention may be embodied otherwise without departing from such principles.

What is claimed is:
1. A power tool comprising:
a drive motor;
a drive shaft connected to the drive motor so as to be driven in rotation about an axis of rotation;
a disk fixedly secured to the drive shaft so as to rotate with the drive shaft and comprising a first face and a second face opposite the first face;
at least one knife arranged on the first face of the disk that in operation of the power tool is facing the ground;
wherein the at least one knife is fixedly connected to the disk and a driving torque for rotatingly driving the at least one knife about the axis of rotation is transmitted from the disk onto the at least one knife;
wherein a spacing of a radial outer edge of the at least one knife relative to the axis of rotation is smaller than a radius of the disk;
wherein the disk comprises an inner area that is adjoined by an outer area of the disk, wherein the at least one knife is resting on the disk in the inner area of the disk;
wherein in the outer area of the disk, a spacing between the at least one knife and the disk gradually increases, across an entire width of the at least one knife, to a maximum spacing with an increasing radial distance from the axis of rotation, wherein the maximum spac- ing of the at least one knife amounts to approximately 1% to approximately 20% of a length of the at least one knife.

2. The power tool according to claim 1, wherein the disk comprises a receptacle configured to receive the at least one knife.

3. The power tool according to claim 2, wherein the disk comprises at least one web delimiting the receptacle, wherein the at least one web contacts a longitudinal side of the at least one knife received in the receptacle.

4. The power tool according to claim 2, wherein the receptacle comprises a bottom and the at least one knife is resting on the bottom.

5. The power tool according to claim 4, wherein the bottom comprises a rib structure that forms a support for the at least one knife.

6. The power tool according to claim 1, wherein the at least one knife and the disk are connected to each other by form fit.

7. The power tool according to claim 6, wherein the disk comprises at least one pin positioned at a spacing away from the axis of rotation and wherein the at least one knife comprises at least one opening, wherein the at least one pin engages the at least one opening.

8. The power tool according to claim 1, comprising a fastening element, wherein the at least one knife is secured by the at least one fastening element in a direction of the axis of rotation on the drive shaft, wherein the disk comprises at least one securing device for securing the fastening element.

9. The power tool according to claim 8, wherein the fastening element comprises a connecting element and wherein the securing device prevents rotation of the connecting element in a release direction.

10. The power tool according to claim 8, wherein the disk comprises at least one actuating element for releasing the securing device.

11. The power tool according to claim 10, wherein the at least one actuating element is formed monolithic with the disk.

12. A power tool comprising:
a drive motor;
a drive shaft connected to the drive motor so as to be driven in rotation about an axis of rotation;
a disk fixedly secured to the drive shaft so as to rotate with the drive shaft and comprising a first face and a second face opposite the first face;
at least one knife arranged on the first face of the disk that in operation of the power tool is facing the ground;
wherein the at least one knife is fixedly connected to the disk and a driving torque for rotatingly driving the at least one knife about the axis of rotation is transmitted from the disk onto the at least one knife;
wherein a spacing of a radial outer edge of the at least one knife relative to the axis of rotation is smaller than a radius of the disk and wherein a length of the at least one knife is greater than the radius of the disk;
wherein the disk comprises an inner area that is adjoined by an outer area of the disk;
wherein, in the outer area of the disk, a spacing between the at least one knife and the disk gradually increases, across an entire width of the at least one knife, to a maximum spacing with an increasing distance, measured in a direction of the length of the at least one knife, from the axis of rotation;
wherein the at least one knife is resting on the disk in the inner area of the disk.

13. A power tool comprising:
a drive motor;
a drive shaft connected to the drive motor so as to be driven in rotation about an axis of rotation;
a disk fixedly secured to the drive shaft so as to rotate with the drive shaft and comprising a first face and a second face opposite the first face;
at least one knife arranged on the first face of the disk that in operation of the power tool is facing the ground;
wherein the at least one knife is fixedly connected to the disk and a driving torque for rotatingly driving the at least one knife about the axis of rotation is transmitted from the disk onto the at least one knife;
wherein a spacing of a radial outer edge of the at least one knife relative to the axis of rotation is smaller than a radius of the disk;
wherein the disk comprises an inner area that is adjoined by an outer area of the disk;
wherein the at least one knife is resting on the disk in the inner area of the disk;
wherein in the outer area of the disk, a spacing between the at least one knife and the disk gradually increases, across an entire width of the at least one knife, to a maximum spacing with an increasing distance, measured in a direction of length of the at least one knife, from the axis of rotation;
wherein the axis of rotation extends through the at least one knife.

14. The power tool according to claim 13, wherein the at least one knife comprises longitudinal sides and wherein the width of the at least one knife corresponds to a spacing of the longitudinal sides relative to each other.

15. The power tool according to claim 13, wherein the at least one knife comprises longitudinal sides and radial outer edges, wherein the direction of length of the at least one knife is located in a plane that is defined by the radial outer edges and the direction of length extends parallel to the longitudinal sides.

16. The power tool according to claim 13, wherein the at least one knife comprises longitudinal sides that are parallel to each other.

17. The power tool according to claim 13, wherein the disk comprises a curved part that is bulging in a direction toward the ground.

18. The power tool according to claim 13, wherein the disk comprises an outer rim and the outer rim of the disk is slightly curved in a direction toward the ground.

19. The power tool according to claim 13, wherein, in the outer area of the disk, the disk comprises a curved part that is bulging in a direction toward the ground.

20. The power tool according to claim 19, wherein the curved part of the disk is spaced from the axis of rotation by a distance that amounts to approximately 20% to approximately 49% of the diameter of the disk.

* * * * *